UNITED STATES PATENT OFFICE.

ARTHUR WILLIAM KING, OF LONDON, ENGLAND, ASSIGNOR TO CHARLES ROGERS, OF LONDON, ENGLAND.

MEANS FOR SOLDERING ALUMINIUM.

No. 811,725. Specification of Letters Patent. Patented Feb. 6, 1906.

Application filed August 12, 1905. Serial No. 273,978.

*To all whom it may concern:*

Be it known that I, ARTHUR WILLIAM KING, mechanic, a subject of the King of England, residing at 9 Letchworth street, High Road, Tooting, London, England, have invented a certain new and useful Means for Soldering Aluminium, of which the following is a full, clear, and exact description, and for which application for patent has been made in Great Britain, dated February 21, 1905.

This invention relates to a special solder for aluminium. By means of this special solder it is possible to unite aluminium coated therewith to either aluminium similarly "tinned" or to another metal coated with ordinary solder, the connection between the two coated surfaces in either case being then practicable by means of ordinary commercial soft solder.

To prepare the special solder which in the case of the aluminium acts as a coating for the reception of ordinary solder, I melt together soft solder, which is generally composed of one part of tin and two parts of lead, zinc, and aluminium in the following proportions: ten parts, by weight, of soft solder, five parts, by weight, of pure zinc, five to eight parts, by weight, of aluminium. These ingredients are conveniently melted in an iron pot until the mixture attains a low red heat and has been thoroughly well stirred and mixed. I then pour the mixture into a mold, so that the finished special solder or flux may be in the shape of strips, bars, cakes, or otherwise.

In utilizing the above to enable me to solder aluminium to aluminium by means of ordinary soft solder composed of tin and lead I first clean the surfaces by scraping them bright—for example, with an old knife. Heat is then applied to the surfaces, preferably by means of a spirit-lamp, since this does not blacken the surfaces to be soldered. The above solder is then rubbed thereon (without the previous use of spirits or resin) until it begins to adhere so as to coat the aluminium, and the coated surfaces are then cleaned by scraping or otherwise. Thereafter it is possible to unite the two coated pieces of aluminium by using ordinary soft solder, no spirits or resin being required to enable the ordinary solder to adhere to the above special solder.

In order to solder any other metal to aluminium, I prepare the aluminium and coat it with the special solder, as previously described. The piece of other metal—*e. g.*, brass—is then prepared and coated in the usual way with soft solder and either killed spirits of salts—that is, hydrocloric acid neutralized with zinc or resin—and the prepared surface then carefully cleaned and washed in, for example, water to remove all traces of the spirits or resin. This second metal and the aluminium, both differently coated, can then be soldered together and united by means of ordinary commercial soft solder, applying heat in the usual way.

The joint between the aluminium and aluminium or between the aluminium and brass will stand boiling in a solution of soda and is unaffected by weather.

In the case of refractory metal, such as iron, it may be necessary to use a hard solder for the iron.

The special solder must be kept clean and free from grease. It must not come in contact with mercury or it will be spoiled and is then useless for the above purposes.

While I have referred to the soft solder as being composed of one part of tin and two of lead, these proportions may be varied, and hence I do not wish to be limited to exact proportions.

Having thus described my invention, what I claim as such, and desire to secure by Letters Patent, is—

A coating whereby ordinary solder can be used to solder aluminium, which is obtained by melting together to a low red heat and well mixing ten parts soft solder composed of tin and lead of the character specified, five parts of pure zinc and five to eight parts of aluminium.

In witness whereof I have hereunto set my hand in the presence of two witnesses.

ARTHUR WILLIAM KING.

Witnesses:
 VICTOR F. FEENY
 CYRIL J. FEENY.